United States Patent
Qin et al.

(10) Patent No.: US 9,985,721 B2
(45) Date of Patent: May 29, 2018

(54) METHOD AND SYSTEM FOR AUTOMATICALLY CALCULATING CABLE ATTENUATION BETWEEN A SATELLITE TERMINAL AND A RADIO ACROSS A FREQUENCY SPECTRUM

(71) Applicant: Hughes Network Systems, LLC, Germantown, MD (US)

(72) Inventors: Liming Qin, Germantown, MD (US); Yong Kang Yuan, Germantown, MD (US); Bryan Gillespie, Germantown, MD (US); Yiqing He, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days. days.

(21) Appl. No.: 15/634,884

(22) Filed: Jun. 27, 2017

(65) Prior Publication Data
US 2017/0353233 A1   Dec. 7, 2017

Related U.S. Application Data

(60) Continuation-in-part of application No. 15/213,209, filed on Jul. 18, 2016, which is a division of
(Continued)

(51) Int. Cl.
*H04B 7/185* (2006.01)
*H04W 52/24* (2009.01)
*H04B 17/318* (2015.01)

(52) U.S. Cl.
CPC ..... *H04B 7/18597* (2013.01); *H04B 7/18517* (2013.01); *H04B 7/18528* (2013.01); *H04B 17/318* (2015.01); *H04W 52/248* (2013.01)

(58) Field of Classification Search
CPC .............. H04B 7/18517; H04B 7/18528
(Continued)

(56) References Cited

U.S. PATENT DOCUMENTS

| 5,754,943 A | 5/1998 | Arai |
| 6,763,222 B1 | 7/2004 | Bukhari |

(Continued)

FOREIGN PATENT DOCUMENTS

WO    2009033155    3/2009

OTHER PUBLICATIONS

International Search Report and Written Opinion for International App No. PCTUS2016015043, dated Apr. 15 2016, Authorized Offier: Bettiol, Brigitle.

*Primary Examiner* — John J Lee
(74) *Attorney, Agent, or Firm* — Sheppard Mullin; Daniel Yannuzzi; Jonathan Marina

(57) ABSTRACT

A very small aperture terminal (VSAT) installation tool is provided having the ability to measure cable loss along an interfacility link (IFL) between an outdoor unit and an indoor unit of the VSAT. Radio frequency (RF) signals can be transmitted from the indoor unit to the outdoor unit, where the RF signals are intercepted along the IFL prior to reaching the outdoor unit, and the output power is determined. The determined output power is compared to an expected output power at the indoor unit. The delta between the determined output power and the expected output power can be used to adjust the power of the indoor unit such that the outdoor unit can operate without reaching its compression point. The determined output power can be extrapolated based upon measured of the output power performed over a range of frequencies at which the indoor unit operates.

20 Claims, 10 Drawing Sheets

Related U.S. Application Data application No. 14/606,318, filed on Jan. 27, 2015, now Pat. No. 9,425,891.

(58) Field of Classification Search
USPC ...... 455/13.1, 13.4, 12.1, 427, 522, 69, 430, 455/429
See application file for complete search history.

(56) References Cited

U.S. PATENT DOCUMENTS

| | | | |
|---|---|---|---|
| 8,890,727 B1* | 11/2014 | da Silva | H03M 1/185 |
| | | | 341/118 |
| 9,166,640 B2 | 10/2015 | Bakalski | |
| 2002/0119797 A1 | 8/2002 | Woodhead | |
| 2002/0132580 A1* | 9/2002 | Buer | H04B 7/18513 |
| | | | 455/13.4 |
| 2002/0173270 A1 | 11/2002 | Buer | |
| 2009/0168864 A1 | 7/2009 | Teramoto | |
| 2010/0105448 A1* | 4/2010 | Andrys | H03G 3/007 |
| | | | 455/571 |
| 2011/0273162 A1 | 11/2011 | Chen | |
| 2012/0157020 A1 | 6/2012 | Sasaki | |
| 2012/0252520 A1 | 10/2012 | Xu | |
| 2013/0128805 A1 | 5/2013 | Tang | |
| 2014/0185704 A1 | 7/2014 | Sturkovich | |
| 2015/0204940 A1 | 7/2015 | Teeter | |
| 2016/0149543 A1 | 5/2016 | Anderson | |

\* cited by examiner

METHOD AND SYSTEM FOR AUTOMATICALLY CALCULATING CABLE ATTENUATION BETWEEN A SATELLITE TERMINAL AND A RADIO ACROSS A FREQUENCY SPECTRUM

CROSS-REFERENCE TO RELATED APPLICATIONS

The present application is a continuation-in-part of U.S. patent application Ser. No. 15/213,209 filed Jul. 18, 2016, which is a divisional of U.S. application Ser. No. 14/606,318, filed on Jan. 27, 2015, now U.S. Pat. No. 9,425,891, issued on Aug. 23, 2016, all of which are incorporated herein by reference in its entirety.

TECHNICAL FIELD

The present disclosure relates generally to satellite networks. More particularly, some embodiments of the present disclosure are directed toward systems and methods for measuring cable loss on a link between an indoor unit and an outdoor unit.

BACKGROUND

Modern satellite communication systems provide a robust and reliable infrastructure to distribute voice, data, and video signals for the global exchange and broadcasting of information. These satellite communication systems have emerged as a viable option to terrestrial communication systems for carrying data traffic such as Internet traffic. A typical satellite Internet system comprises subscriber terminals, a satellite, a ground station, and connectivity to the Internet. Communication in such a system occurs along two links: 1) an uplink (or inroute) from a subscriber terminal to the satellite to the ground station to the gateway to the internet; and 2) a downlink (or outroute) from the internet to the gateway to the ground station to the satellite to the subscriber terminal.

Very Small Aperture Terminals (VSATs) are commonly used as subscriber terminals for transmitting and receiving wireless signals on phase modulated carriers in satellite communications systems. On the transmission (inroute) side, a VSAT includes an indoor unit (IDU) for modulating a signal with information, an example of which may be a satellite Internet modem which can be connected to a customer's computer equipment. The VSAT may also include an outdoor unit (ODU) made up of a block upconverter (BUC) for upconverting the frequency band of the signal (e.g., from the L band to a Ka, C, or Ku band), and a parabolic dish antenna for focusing and transmitting the upconverted signal to a satellite. Moreover, the ODU can include low noise block (LNB) converters that work in conjunction with the BUC. The LNB converters make up the receive portion of the radio equipment, and can be used to down-convert received signals (which are high frequency signals in the Ka, C, or Ku band) to the L band.

SUMMARY

In accordance with one embodiment, a power detector for detecting the output power of a satellite indoor unit connected to a satellite outdoor unit by a cable may comprise the following: a filter for substantially isolating radio frequency (RF) signals transmitted at each of a plurality of frequencies from the satellite indoor unit to the satellite outdoor unit at a termination point of the cable that connects the cable to the satellite outdoor unit; an RF detector configured to detect the RF signals; and a microcontroller comprising an analog to digital converter (ADC) component configured to convert the detected RF signals into voltage data. The microcontroller may be further configured to: convert the voltage data into power attenuation over the cable data; store the power attenuation over the cable data in conjunction with extrapolated power attenuation over the cable data determined based upon the power attenuation over the cable data; and transmit at least one of the power attenuation over the cable data and the extrapolated power attenuation over the cable data to the satellite indoor unit for adjustment of the satellite indoor unit output power to avoid compression at the satellite outdoor unit.

In some aspects, the filter may comprise a high pass filter. In some aspects, the microcontroller transmits the voltage data via a digital satellite equipment control (DISEqC) interface.

In some aspects, the RF signals comprise low power continuous wave tones transmitted at different frequencies covering the L band frequency range. Moreover, in some aspects, the satellite indoor unit comprises at least one of a set-top box receiver and a satellite Internet modem.

In some aspects, the satellite outdoor unit comprises a block upconverter.

In some aspects, the microcontroller is configured to average the detected RF signals associated with each of the plurality of frequencies, and wherein the conversion of the detected RF signals into the voltage data comprises conversion of the averaged, detected RF signals into the voltage data. The conversion of the voltage data into power attenuation over the cable data may comprise subtracting the voltage data indicative of the satellite indoor unit output power over the cable from the satellite indoor unit output power prior to transmission over the cable.

In some aspects, the satellite indoor unit output power is at least one of temperature compensated and calibrated.

In accordance with one embodiment, a device may comprise a first interface comprising an input connected to a cable, wherein the cable comprises a first end connected to a satellite indoor unit and a second end connected to the input of the first interface. The device may include a second interface, comprising an input connected to an output of the first interface, and an output connected to a satellite outdoor unit. Further still, the device may include a power detector for measuring transmit power loss of signals transmitted at each of a plurality of frequencies by the satellite indoor unit along the first end of the cable to the second end of the cable. The device may also include a microcontroller for storing data regarding the measured transmit power loss in a data store comprising a plurality of measured transmit power loss data including extrapolated power loss data based upon the plurality of measured transmit power loss data relative to each of the plurality of frequencies. The device may also include a third interface through which the extrapolated transmit power loss data is transmitted to a modem of the indoor unit, the modem of the indoor unit adjusting its power output based upon the extrapolated transmit power loss data.

In some aspects, the first interface comprises a receive interfacility (IFL) component and wherein the second interface comprises a low noise block (LNB) IFL component. In some aspects, the communications link comprises at least one IFL coaxial cable connecting a satellite indoor unit to a satellite outdoor unit.

In some aspects, the power detector detects power associated with radio frequency (RF) signals transmitted from the first interface to the second interface. The RF signals may comprise low power continuous wave tones transmitted across each of the plurality of frequencies.

In some aspects, the third interface comprises a digital satellite equipment control (DISEqC) interface. In some aspects, the microcontroller averages the stored data regarding the measured transmit power loss such that the extrapolated power loss data is based upon the averaged transmit power loss data relative to each of the plurality of frequencies. The power output of the modem of the indoor unit may be at least one of temperature compensated and calibrated.

In accordance with one embodiment, a system may comprise the following: a satellite indoor unit comprising an output; a satellite outdoor unit comprising an input, a block upconverter (BUC), and an antenna dish; a cable connecting the output of the satellite indoor unit to the input of the satellite outdoor unit; and a power detector for detecting the output power of the satellite indoor unit at the input of the satellite outdoor unit. The power detector may comprise the following: a filter for substantially isolating radio frequency (RF) signals transmitted from the satellite indoor unit to the satellite outdoor unit at the input of the satellite outdoor unit; an RF detector configured to detect the RF signals; and a microcontroller comprising an analog to digital converter (ADC) component configured to convert the detected RF signals into voltage data. The microcontroller may be further configured to: convert the voltage data into power attenuation over the cable data; store the power attenuation over the cable data in conjunction with extrapolated power attenuation over the cable data determined based upon the power attenuation over the cable data; and transmit at least one of the power attenuation over the cable data and the extrapolated power attenuation over the cable data to the satellite indoor unit for adjustment of the satellite indoor unit for adjustment of the satellite indoor unit output power to avoid saturation at the BUC of the satellite outdoor unit.

In some aspects, the system may comprise an antenna pointing tool, wherein the antenna pointing tool comprises: the power detector; a receive interfacility (IFL) component; and a low noise block (LNB) IFL component.

In some aspects, the satellite indoor unit output power is at least one of temperature compensated and calibrated.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In order for a satellite terminal to drive certain types of radios at their optimal power level, the amount of attenuation through, e.g., a cable connecting a radio to a satellite terminal should be known. Attenuation through such as a connecting cable may vary based on certain factors or variables, including, for example, the frequency of the signal traveling through the cable, the length of the cable, and the type of cable being utilized.

Various embodiments of the systems and methods disclosed herein provide mechanisms for measuring the cable loss between an IDU and ODU across a plurality of frequencies. This cable loss measurement allows the IDU to be aware of the power that is reaching the ODU, thereby allowing the IDU to set the power reaching the BUC at a level that avoids the BUC from going into a saturation state. Such cable loss measurements in accordance with various embodiments can be accomplished by utilizing a BUC, transceiver install tool, or antenna pointing tool having an integrated power detector for estimating cable loss. It should be noted that various embodiments disclosed herein can be applied to any VSAT terminal install without the need for any specialized BUC or integrated transceivers, or any expensive power meters. Moreover, various embodiments are applicable to any installation scenario or context that involves some indoor radio unit and outdoor radio unit (or simply, radio units located remotely from each other) that are connected via cable or other lossy link.

In some embodiments, cable loss measurements can be extrapolated as a function of frequency. That is, cable loss relative to a plurality of frequencies can be measured as alluded to above. These cable loss measurements can be stored. Linear regression techniques can be applied to the stored cable loss measurements so that cable loss measurements can be extrapolated over an extended range of frequencies. These extrapolated cable loss measurements can be stored, e.g., in a table, that can be accessed to obtain applicable cable loss measurements used to set the power of the IDU.

Figure 1:
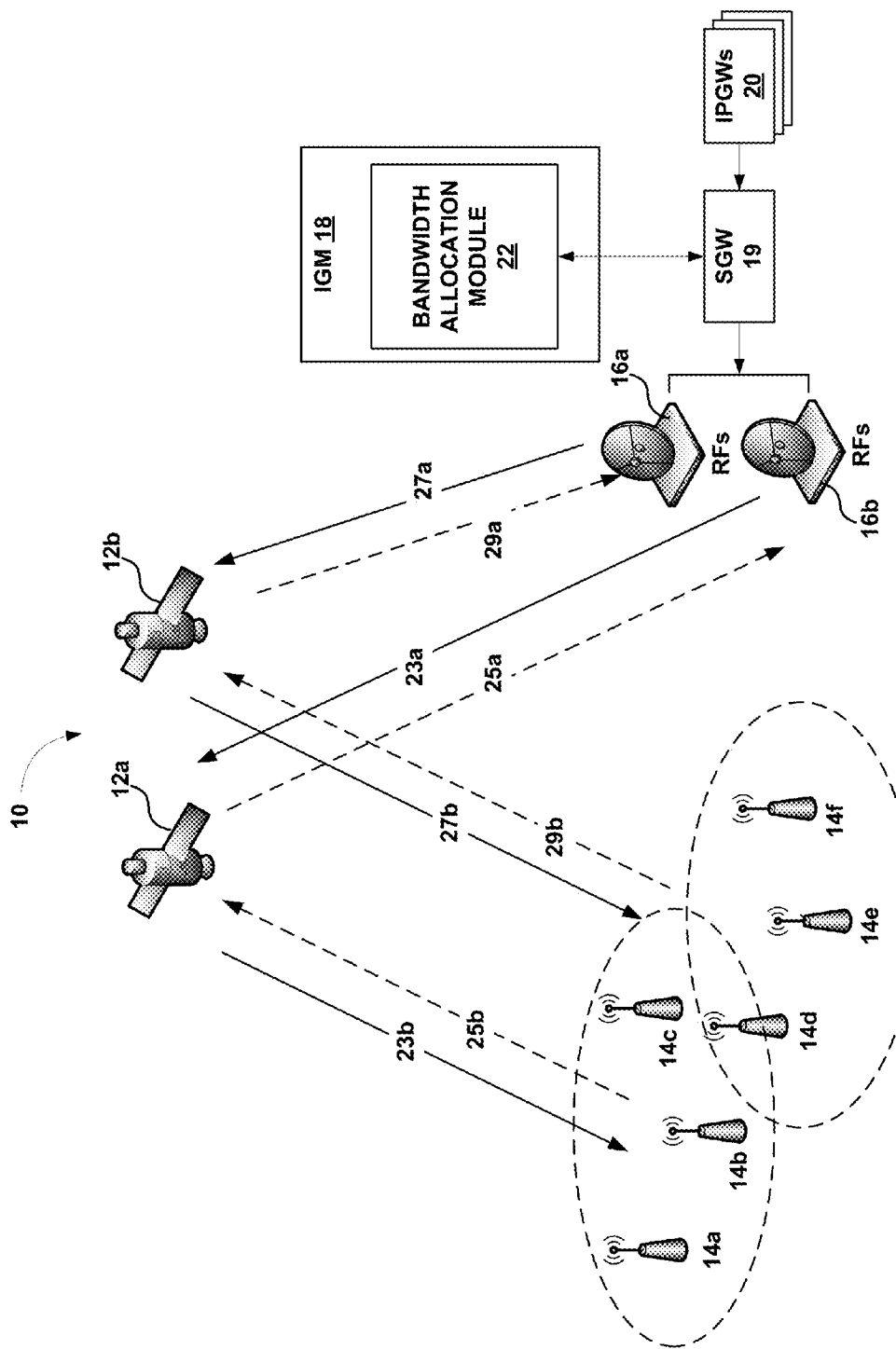
FIG. 1 illustrates an example multi-satellite data transmission system in which embodiments of the technology disclosed herein may be implemented.

FIG. 1 illustrates an example satellite network 10 in which elements involved in satellite communications/traffic are described. Satellite network 10 in this example can include multiple satellites 12a and 12b, remote terminals 14a-14f, radio frequency (RF) terminals 16a and 16b, multiple inroute group managers (IGMs) 18a, 18b, . . . 18n, satellite gateway (SGW) 19, and IP gateways (IPGWs) 20. The satellite network may be a shared access broadband network. Other types of shared access networks may include, for example, wireless networks such as $4^{th}$ Generation Long Term Evolution (4G LTE) and WiMAX networks, which may include terminals other than VSATs, such as cellular and WiFi equipped devices.

Feeder links may carry data between RF terminals 16a and 16b and satellites 12a and 12b, and may include: forward uplinks 23a and 27a for transmitting data from RF terminals 16a and 16b to satellites 12a and 12b, respectively; and return downlinks 25a and 29a for transmitting data from satellites 12a and 12b, respectively, to RF terminals 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form an outroute, and return uplinks 25b, 29b and return downlinks 25a, 29a may form an inroute. SGW 19 may include high capacity earth stations with connectivity to ground telecommunications infrastructure. SGW 19 may be communicatively connected to RF terminals 16a and 16b. RF terminals 16a and 16b may be the physical equipment responsible for sending and receiving signals to and from satellites 12a and 12b, respectively, and may provide air interfaces for SGW 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band, Ku-band, or C-band. Satellites 12a and 12b may use one or more spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 32-APSK. The signals intended to pass through satellites 12a and 12b in the return direction (from terminals 14a-14f) may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic, from the internet may enter an SGW 19 through IPGWs 20. IPGWs 20 may each include a spoofer, which may acknowledge IP traffic, including TCP traffic sent to SGW 19. Moreover, SGW 19 may be connected to an internet through IPGWs 20. IP traffic, including TCP traffic, from the internet may enter SGW 19 through IPGWs 20. As illustrated in FIG. 1, multiple IPGWs may be connected to a single IGM. The bandwidth of RF terminals 16a and 16b can be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

Data from the internet intended for remote terminals 14a-14f (e.g., VSATs) may be in the form of IP packets, including TCP packets and UDP packets, or any other suitable IP packets, and may enter SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RF terminals 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the SGW 19/IPGWs 20 using return downlinks 25a and 29a.

Each of remote terminals 14a-14f may connect to the Internet through satellites 12a and 12b and IPGWs 20/SGW 19. For example, remote terminal 14a may be used at a residence or place of business to provide a user with access to the Internet. VSATs or Mobile Satellite Terminals (MSTs), as previously described, may be used by end users to access the satellite network, and may include a remote satellite dish antenna for receiving RF signals from and transmitting RF signals to satellite 12a, as well as a satellite modem and other equipment for managing the sending and receiving of data. They may also include one or more remote hosts, which may be computer systems or other electronic devices capable of network communications at a site.

One or more IGMs can be implemented (e.g., IGM 18). IGM 18 may be a bandwidth controller running bandwidth allocation algorithms, e.g., bandwidth allocation component 22. Thus, IGM 18 may manage bandwidth of the remote terminals 14a-14f in the form of inroute groups (IGs), based in part on bandwidth demand requests from the remote terminals 14a-14f.

Figure 2:
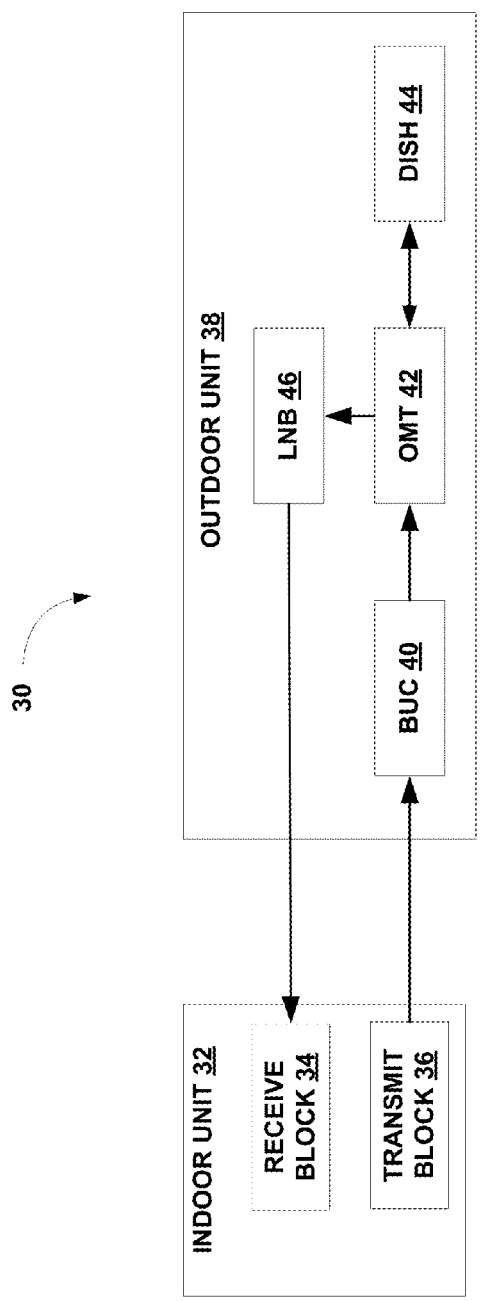
FIG. 2 is a block diagram illustrating an example VSAT which can be installed using embodiments of the technology disclosed herein.

FIG. 2 is a block diagram illustrating an example VSAT 30 that may be installed utilizing an installation tool/antenna pointing device configured in accordance with embodiments of the technology disclosed herein. As illustrated, VSAT 30 comprises an IDU 32 and an ODU 38. ODU 38 includes a block up converter (BUC) 40, orthomode transducer (OMT) 42, a low-noise block (LNB) downconverter 46, and antenna dish 44. BUC 40 may be mounted on dish 44 and is used in the transmission of satellite inroute signals by frequency upconverting a signal received from transmit block 36 of IDU 32. The upconverted signal may be sent through a horn to dish 44, which focuses the signal into a narrow beam for transmission.

LNB 46 may be mounted on dish 44 and is configured to receive the outroute signal collected by dish 44, amplify it, and down-convert the band of received frequencies. The down-converted signal is then transmitted to IDU 32 for processing. OMT 42 may orthogonally polarize the receive and transmit signals, thereby preventing interference and protecting LNB 46 from burnout by the power of the output signal generated by BUC 40. In various implementations, dish 44 may be any small aperture parabolic antenna design configured to receive and transmit electromagnetic signals to and from one or more satellites.

In various embodiments, IDU 32 may be a set-top box or satellite modem including a receive block 34 and a transmit block 36. Receive block 34 receives down-converted outroute signals from LNB 46 via a receive cable (e.g., coaxial cable), and may perform functions such as signal decryption and decoding to extract information (e.g., data, voice, video) from the received signals. The extracted information may then be used by a user of VSAT 30 (e.g., for Internet or Satellite TV).

Transmit block 36 may receive information from a user's equipment (not shown) or from the set-top box itself, and it may modulate a reference signal in accordance with this information to produce a modulated information signal. The modulated information signal may then be transmitted to ODU 38 over a transmit cable (e.g., a coaxial cable) for upconversion by BUC 40 and transmission by dish 44. The transmitted signal may carry any suitable information, such as, for example, data, voice, and video information. In one embodiment, transmit block 36 may supply ODU 38 with a DC power signal, a carrier on/off signal, or both. Either or both of these signals may be, in accordance with another embodiment, multiplexed with the modulated information signal and transferred to ODU 38 as a single signal via a single cable.

During installation of a VSAT, the antenna should be properly pointed to the appropriate satellite so that it can communicate with the satellite in accordance with its full capacity. For example, when using a narrow Ka band, the antenna should be (accurately) aimed at the satellite to ensure no more than, e.g., 0.2 dB loss of reception and 0.45 dB loss of transmission.

Conventional installation methods that involve 2-way satellite dish antennae often rely on the use of an antenna pointing device or tool capable of providing signal quality factor or audio tone feedback, which do not allow for cable loss measurements. As such, an installer must often rely on trial and error in order to appropriately install a VSAT with respect to setting the power output of the IDU.

In particular, a typical VSAT installation involves installing an IDU, an interfacility link (IFL) cable, and an ODU or outdoor equipment. Currently, installation can be performed using an antenna pointing tool which indicates the signal quality factor when a satellite dish antenna is adjusted in order to point the satellite dish antenna properly. Once receive pointing is completed, the installer must estimate the cable loss for the transmit (coaxial) cable that connects an IDU (modem) to the ODU so that the power transmitted by the IDU does not saturate the BUC.

Cable loss is a consideration during installation due to power loss that exists between the IDU and ODU along the IFL cable. That is, and as described above, saturation at the BUC should be avoided, where saturation refers to the point at which an amplifier can no longer deliver more power despite input levels being increased. Amplifiers are often rated at their 1 dB compression point, the point at which output power becomes non-linear in relation to the input level. Overdriving an amplifier or trying to extract greater than the rated power causes the amplifier to go into compression, which consequently and undesirably, results in signal distortion.

Thus, to avoid compression/saturation, it is preferable to measure the power being transmitted to the BUC so as to avoid a situation where the BUC reaches its compression point. That is, the power from the IDU should be set below the compression point at the BUC so that the BUC can operate in the linear portion of its input/output characteristics. In order to set this power properly, the cable loss along the IFL cable between the IDU and ODU should be considered. Power loss caused by the IFL cable is currently estimated by an installer by performing certain calculations based on the length of the IFL cable. Such a loss estimate is made worse if the installer merely guesses at the IFL cable length, e.g., if a VSAT installation is being performed with existing, previously-installed cable. Thus, when using conventional installation methods, the IFL cable length and estimated cable loss is uncertain causing an inaccurate prediction of transmit power reaching the outdoor equipment. With the inaccuracy in the power loss estimation through the IFL cable, the IDU cannot determine the transmit power needed to accurately avoid compression in the BUC portion of the ODU.

In accordance with conventional installation methods, installers rely on trial and error to set the power of indoor unit until a link to the satellite is established. For example, the installer may start at a low power level based on the aforementioned IFL cable length and estimated power loss, and incrementally increase transmit power in 1 dB increments. This can be a very time-consuming and inefficient process. Once a link is established, a closed loop power control system that monitors power control errors for data transmissions can be used to stabilize the system. In accordance with other conventional installation methods a spectrum analyzer and tracking generator may be used to measure loss through a given cable, although this is an expensive and laborious process that is not viable for enterprise-grade installation services.

Figure 3:
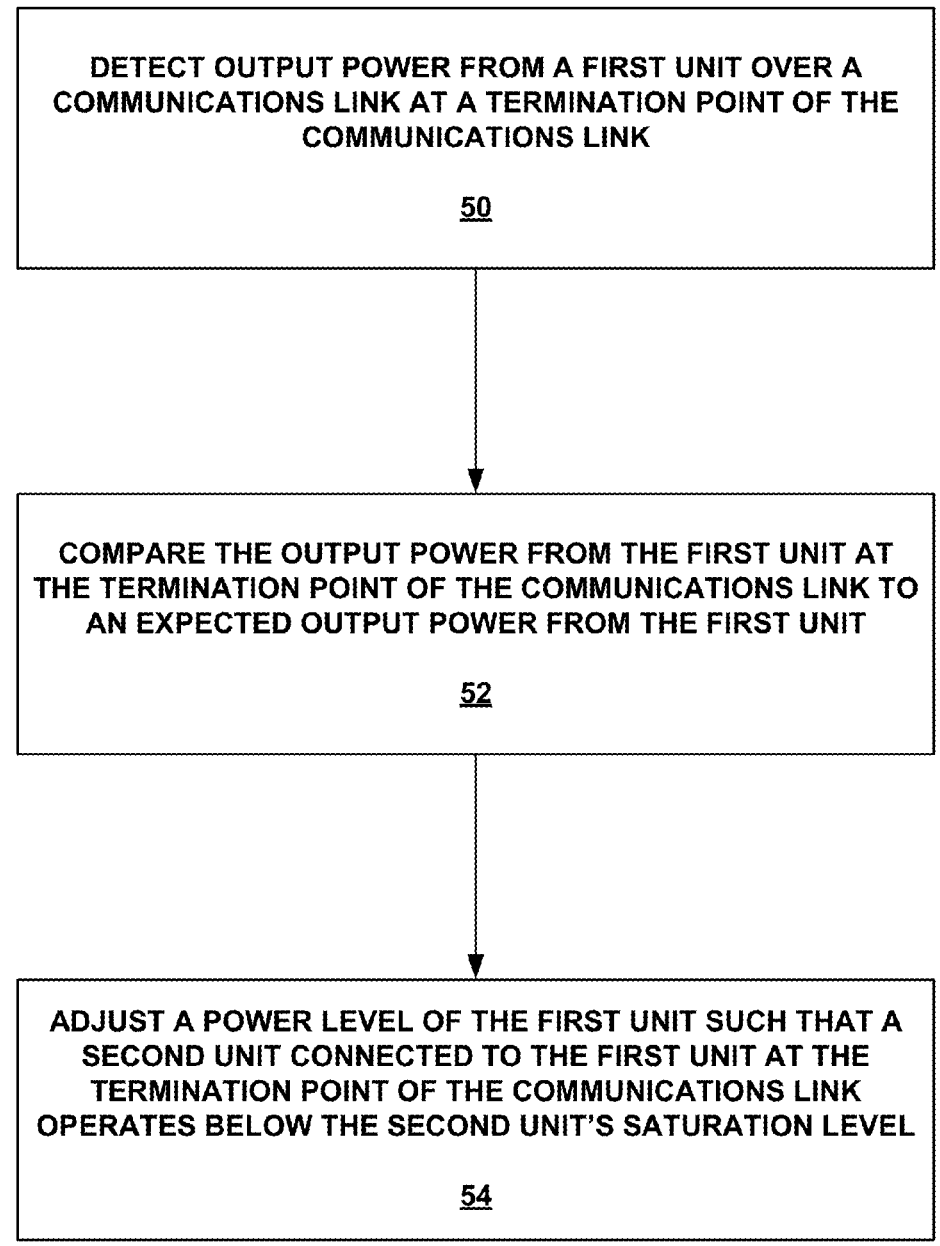
FIG. 3 is an operational flow chart illustrating example processes performed for the measurement of cable loss in accordance with various embodiments of the technology disclosed herein.

To avoid the need for installers to make adjustments to the IDU modem output power using trial and error and/or guessing at the cable loss realized along the IFL cable, a power detector circuit can be added to an antenna pointing tool for accurately predicting the cable loss across frequencies in accordance with various embodiments of the technology disclosed herein. FIG. 3 illustrates example operations performed for measuring cable loss in accordance with various embodiments. At operation 50, the output power is detected from a first unit, e.g., an IDU, over a communications link, e.g., an IFL cable, at a termination point of the communications link, e.g., at the ODU and IFL cable connection point. At operation 52, the output power from the first unit at the termination point of the communications link is compared to an expected output power from the first unit. As will be discussed in greater detail below, the known/ expected power output from an IDU is known and can be used to determine the cable loss over the IFL cable. At operation 56, the power level of the first unit is adjusted such that a second unit, e.g., the ODU (in particular the BUC portion of the ODU), connected to the first unit at the termination point of the communications link operates below its saturation level, as discussed above.

Figure 4A:
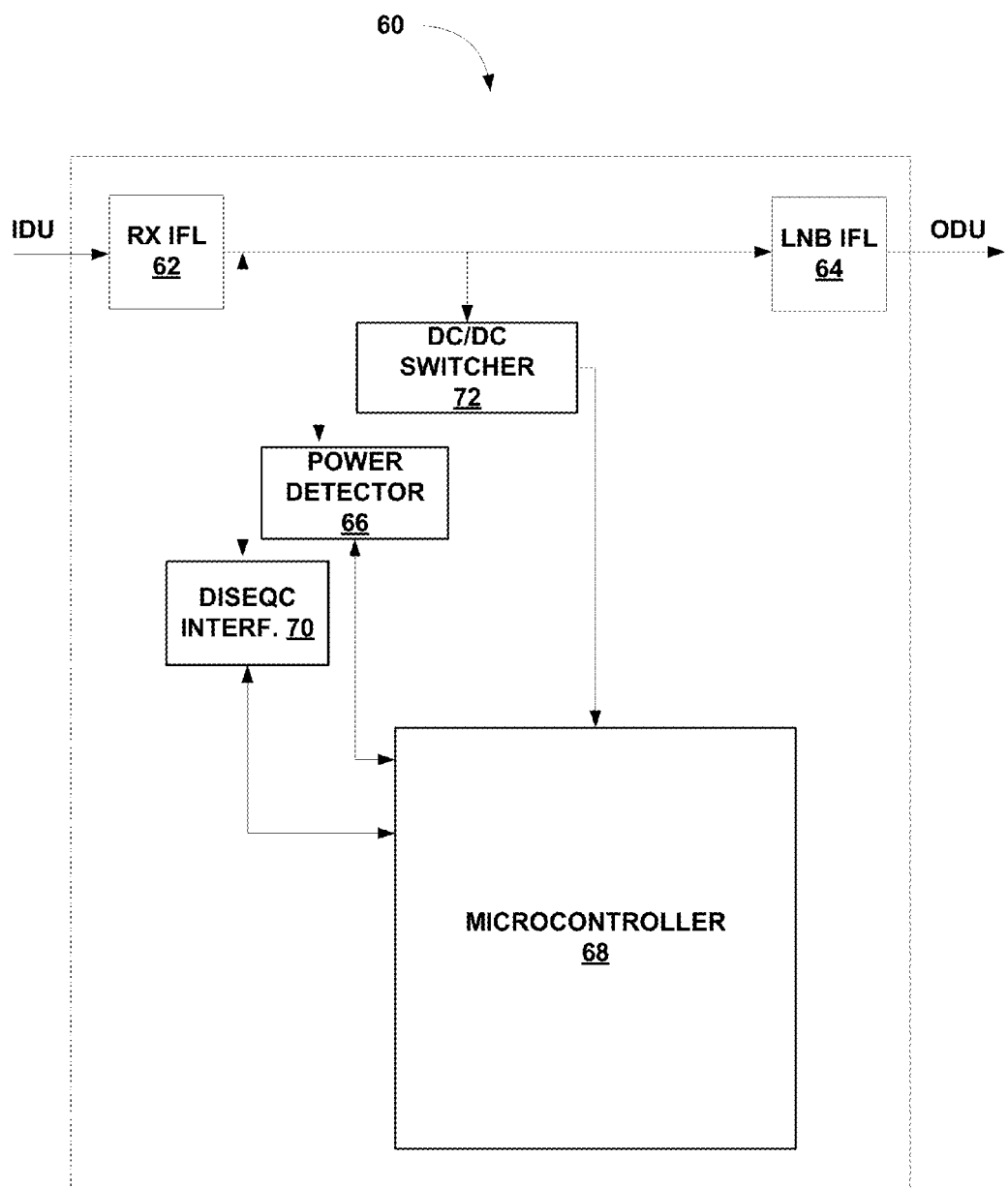
FIG. 4A is a block diagram illustrating an example antenna pointing tool in accordance with various embodiments of the technology disclosed herein.
Figure 4B:
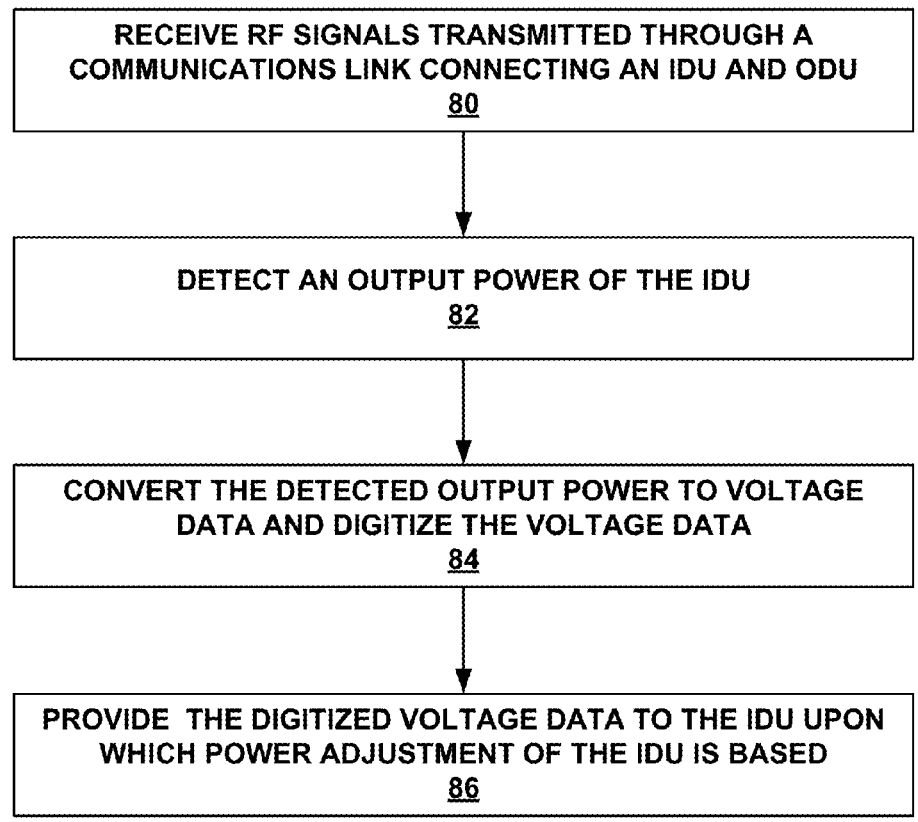
FIG. 4B is an operational flow diagram illustrating an exemplary method of cable loss measurement in accordance with embodiments of the technology disclosed herein.

FIGS. 4A and 4B illustrate a block diagram of an example antenna pointing tool 60 capable of performing cable loss measurements in addition to enabling pointing of a dish antenna, and a corresponding operational flow chart illustrating example processes performed by antenna pointing tool 60 to determine loss in the connection between the satellite IDU and ODU. Antenna pointing tool 60 may be a two-way digital satellite equipment control (DiSEqC) antenna pointing tool (DAPT). DiSEqC refers to a communication protocol for use between a satellite receiver (e.g., IDU/modem) and a dish antenna of an ODU, which allows the DAPT to be "inserted" in-line with the IFL cable between the IDU and ODU for antenna pointing and cable loss measurement.

Antenna pointing tool 60 may further include a DC/DC switcher or converter 72 which converts voltage levels to provide power to antenna pointing tool 60 and microcontroller for controlling one or more aspects of the various functionalities of antenna pointing tool 60. It should be noted that antenna pointing tool 60 may include one or more additional elements or components, e.g., a display, input mechanisms such as buttons, a buffer, voltage regulator, audio driver, etc. (not shown) that can be utilized in effectuating the antenna pointing operations. In operation, a user (e.g., an installer) can connect antenna pointing tool 60 between the IDU (e.g., IDU 32 of FIG. 2) and the ODU (e.g., ODU 38 of FIG. 2) via the IFL cable(s) by way of an RX IFL component or interface 62 and an LNB IFL component or interface 64. In particular, antenna pointing tool 60 can be inserted at the point where the IFL cable originating from the IDU would connect to the ODU (i.e., after the signals from the IDU traverse the IFL cable to the ODU). The user may access a local user interface (LUI) by connecting, e.g., a laptop computer, to the IDU. The LUI allows the user to enter installation parameters such as the latitude and longitude of the dish antenna site and the name of the satellite to which the dish antenna is to be pointed. The dish antenna can then be pointed in the general direction of the satellite to acquire the satellite signal. When the demodulator of the IDU locks onto the satellite beacon signal, antenna pointing tool 60 can display the signal quality factor of the received SNR pointing signal as a numerical value that can be used to find the peak signal level. Once the satellite is located, pointing of the dish antenna can be fine-tuned until the signal level peaks.

Once the antenna pointing portion of the installation process is completed, antenna pointing tool 60, which in accordance with various embodiments includes an integrated power detector, may be used in a cable loss measurement mode to determine power loss between the IDU and ODU. In particular, antenna pointing tool 60 can be switched to a cable measuring/cable loss estimation mode. While in this mode, and as illustrated in FIG. 4B at operation 80, the IDU/modem can transmit RF signals over a communications link (e.g., IFL cable) connecting an IDU and ODU which are received at antenna pointing tool 60 via RX IFL component 62. For example, the IDU can transmit low power continuous wave tones or carriers at different frequencies in order to cover, e.g., the L band frequency range over which the modem is designed to operate. At operation 82, an output power of the IDU is detected. In particular, the output power of the IDU/modem can be detected at antenna pointing tool 60 via a power detector 66. At operation 84, the detected output power is converted to voltage data and digitized, e.g., with an analog to digital converter (ADC). At operation 86, the digitized voltage data is provided to the IDU, i.e., using the aforementioned DISEqC protocol via a DISEqC interface 70, to be used to adjust the power of the IDU.

At the IDU/modem, the detected output power at the end of the IFL (from the IDU/modem) can be compared with a known output power level at the IDU/modem transmit port. It should be noted that the installer can input certain information identifying the type/model of BUC being utilized in the installation in order to ascertain this "expected" output power level of the IDU/modem. The difference between the detected output power and the known/expected output power level is the cable loss attributable to the IFL cable, i.e., the RF signal power loss traveling between the IDU/modem and the satellite dish. This cable loss information can then be displayed on the IDU/modem LUI as well as utilized by the IDU to automatically estimate the transmit power setting needed at the IDU/modem in order to avoid compression/saturation at the ODU.

For example, a BUC of an ODU may be specified to output, e.g., 2 W (33 dBm at 1 dB compression), where the gain of the BUC is, e.g., 56 dB. The maximum power output of the IDU/modem can be calculated by subtracting the gain from the specified output and adding the cable loss. Utilizing antenna pointing tool 60, the cable loss can be determined as described herein. For example, if the cable loss is determined to be, e.g., 15 dB, the maximum power of the IDU/modem can be set to −8 dBm (33 dBm−56 DB+15 dB). It should be noted that the maximum power (also referred to as minimum attenuation) operating point can be a function of transmit frequency and temperature of the IDU/modem (each of which may be compensated for). Moreover, further compensation or consideration may be given regarding an initial ranging attenuation (i.e., adjusting the transmission power of initial ranging burst transmission), where an IGM may broadcast an initial ranging attenuation for each IG.

It should be noted that cable loss information may also be sent to a Network Management Center for logging. That is, the NMC can track how much loss occurs on the IFL cable for different terminals. Based on expected output power of the IDU, cable loss can be determined and monitored to ensure it remains within an acceptable range.

Figure 4C:
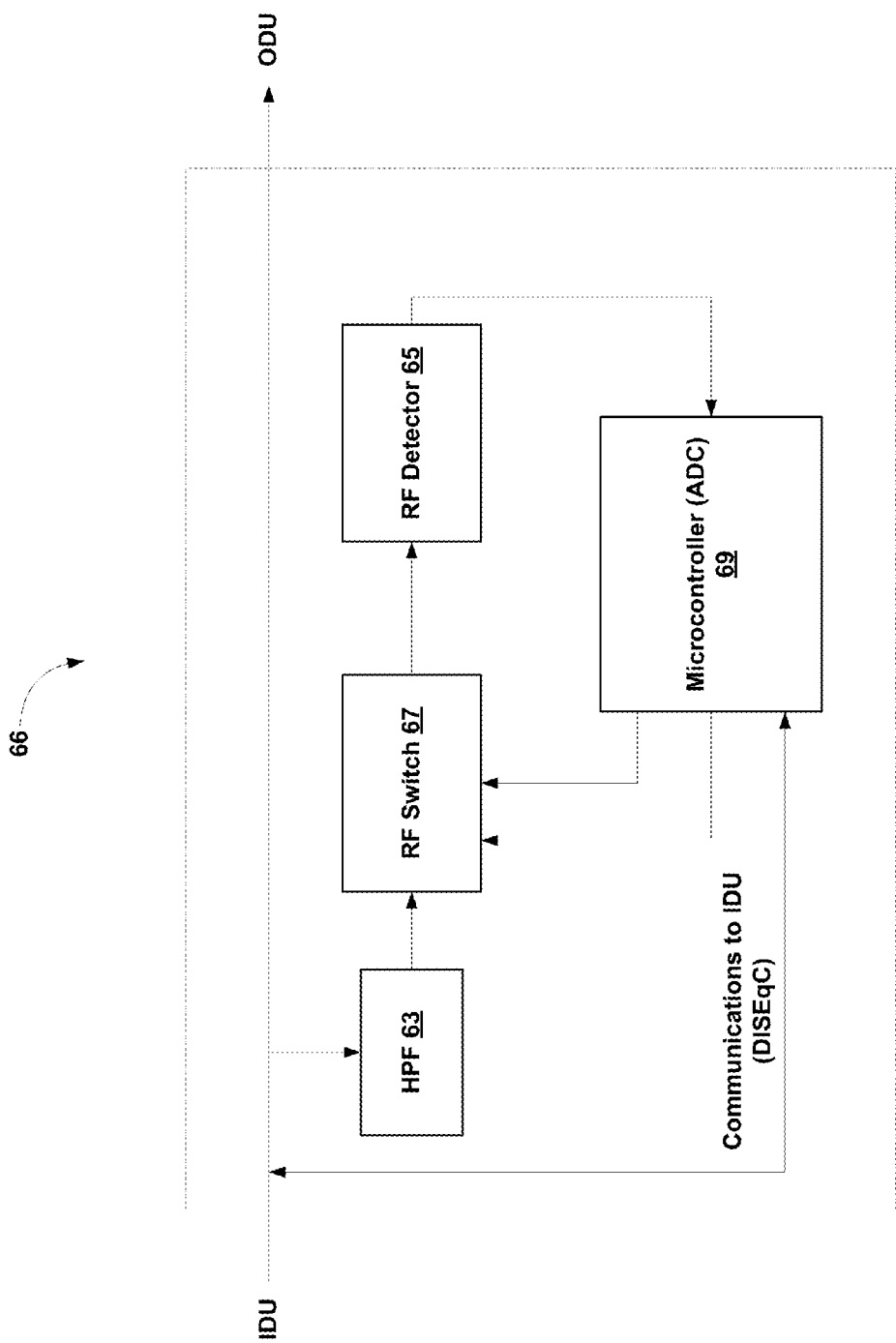
FIG. 4C is a block diagram illustrating an example power detector utilized in the antenna pointing tool of FIG. 4A.

FIG. 4C illustrates a more detailed block diagram illustrating various elements of power detector 66 that can be implemented in an antenna pointing tool in accordance with various embodiments. FIG. 4C illustrates a filter 63, such as a high pass filter (HPF) that can be utilized to perform filtering of lower frequency signals, such as the DISEqC communications to ensure that the output power detected is solely that associated with the RF signals output from the IDU/modem. Additionally, and as alluded to above, the power detector can detect the RF signal, convert the RF signal to a voltage and digitize the voltage (via an ADC), which can then be stored within microcontroller 69. RF switch 67 may be used to route the RF signals on to RF detector 65 when warranted/depending on the mode of operation of antenna pointing tool 60.

It should be noted that although various embodiments described herein have been provided in the context of certain frequencies, e.g., BUC output in the C, Ka, or Ku bands and IDUs operative in the L band (e.g., 950 MHZ to 2 GHZ range), other embodiments contemplate the ability to be adapted for use with other bands/frequencies. Moreover, and although various embodiments have been described in the context of indoor and outdoor cable/Internet satellite units, various embodiments are applicable to any system(s)s, including wireless communications system employing, e.g., a modem and radio unit separated by some medium over which loss can occur. Further still, power detection can be implemented not only in an installation tool (which avoids the need to alter/upgrade radio equipment and provides mobility), power detection can be implemented in radio equipment or other appropriate location/component. It should further be noted that the power detector described herein may be calibrated and immune to temperature variations, which in combination with the IDUs/modem being factory-calibrated, results in accurate cable loss measurements.

For example, in some embodiments, the range of frequencies over which a power detector implemented in an antenna pointing tool operates, as described above, can be extended. That is, the measured output power of an IDU (over a cable) can be used as a basis for extrapolation, such that cable loss, determined from the IDU output power, can be predicted as a function of frequency. In this way, the antenna pointing tool described herein can be used to determine cable loss for frequencies outside its conventional operating ranges.

Figure 5A:
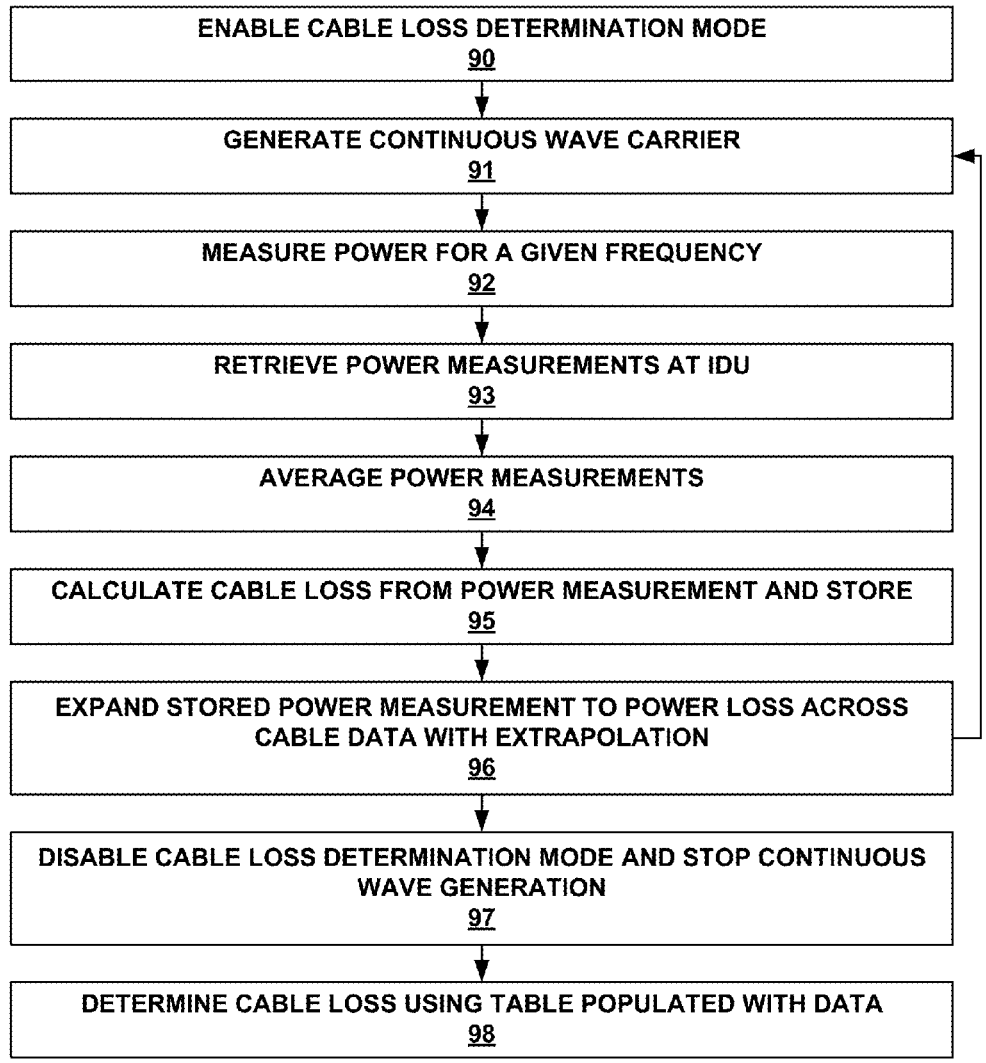
FIG. 5A is an operational flow chart diagram illustrating an exemplary method of cable loss measurement and extrapolation in accordance with embodiments of the technology disclosed herein.

FIG. 5A is an operational flow diagram illustrating example operations that can be performed in accordance with various embodiments for calculating cable loss measurements over an extended frequency range through extrapolation. FIG. 5A will be described in conjunction with FIG. 5B, which is an illustration of an example extrapolation contemplated in accordance with the example operations described in FIG. 5A.

At operation 90, a cable loss determination mode can be enabled on an aforementioned antenna pointing tool or other installation tool. For example, and as described previously, once the antenna pointing portion of the installation process is completed, antenna pointing tool 60, which in accordance with various embodiments includes an integrated power detector, may be switched to or have a cable loss measurement mode enabled to determine power loss between the IDU and ODU.

At operation 91, a continuous wave tone or carrier may be generated. That is, the IDU may generate a continuous wave carrier or tone with a known frequency and power on the cable (e.g., IFL cable) connecting the IDU to the ODU. The frequency can be one over which the IDU/modem is designed to operate. It should be noted that the continuous wave carrier may be generated dynamically, and the IDU may further apply temperature compensations to the power level, described below.

At operation 92, the power output from the IDU on the cable is measured for the given frequency. It should be noted that the antenna pointing tool 60, in particular, power detector 66 of antenna pointing tool 60, measures the power output by the IDU while the continuous wave carrier is present. Power detector 66 may output a corresponding voltage reading based on the measured power. The microcontroller 69 of power detector 66 may convert the voltage reading output by power detector 66 to, e.g., a digital binary value using its built in ADC. The digital binary value representative of the output power can be converted back to a power reading during a subsequent operation.

At operation 93, the power measurements are retrieved at the IDU. Because the power measurements are taken by power detector 66 at the "opposite" side of the cable to which the IDU is attached, antenna pointing tool 60 communicates the measurement made by power detector 66 to the IDU over the cable. For example, the IDU may issue a command to antenna pointing tool 60 via the DiSEqC interface 70 requesting the output power measured by power detector 66. Microcontroller 68 of antenna pointing tool 60 may report back the detected output power (in volts) to the IDU using the DiSEqC protocol via DiSEqC interface 70 and RX interface 62. It should be noted that a calibration power offset at a given frequency may also be retrieved from power detector 66.

At operation 94, the power measurements retrieved at the IDU may be averaged. The IDU may issue commands to antenna pointing device 60 to retrieve a plurality of output power measurements on the cable taken by power detector 66 for a given frequency. The IDU may average the plurality of output power measurements on the cable for each given frequency to generate an average output power per given frequency. In this way, the accuracy of the measured output power on the cable, and ultimately, the extrapolated cable loss measurement data can be improved.

At operation 95, the power measurement can be used to calculate cable loss which can then be stored. That is, the digital binary value to which the measured output power was converted (operation 92) can be converted to a power value using one or more appropriate mathematical formulas or algorithms. Using this converted value, the IDU can calculate the power loss over the length of the cable as follows.

Cable loss=IDU output power−measured power, where IDU output power is the calibrated power present at the output of the IDU. As described above, this IDU output power can be temperature compensated as follows:

IDU output power=Calibrated IDU output power at Calibration temperature+Temperature Compensation Coefficient*(Current temperature−Calibration temperature).

The measured power on the cable is the IDU output power measured by the antenna pointing tool at the point where the IFL cable connects the IDU to the ODU, e.g., the end of the cable. This value can be obtained by multiplying the digital binary ADC value reported by the antenna pointing tool by a conversion constant as follows:

measured power=(measured ADC value/ADC value at full range)*Power Conversion Coefficient+ Power Conversion Offset at the frequency The difference between the two output powers (IDU output power and measured power) is the power loss over the cable.

Additionally, at operation 95, the calculated cable loss data can be stored. For example, the calculated cable loss data can be stored in a data repository in the form of, e.g., a table that correlates calculated cable loss data to frequency in the IDU. Thus, for each frequency or frequency range at which the power output of the IDU on the cable is measured, as described above, a cable loss value can be calculated and associated with the frequency/frequency range.

At operation 96, the table in which the calculated cable loss data is stored can be expanded through extrapolation. In one embodiment, extrapolation can be accomplished using linear regression. Generally, linear regressions can be used to model some relationship between two variables by fitting a linear equation to observed data. In this case, the two variables can include the IDU output power on the cable and a given frequency.

Figure 5B:
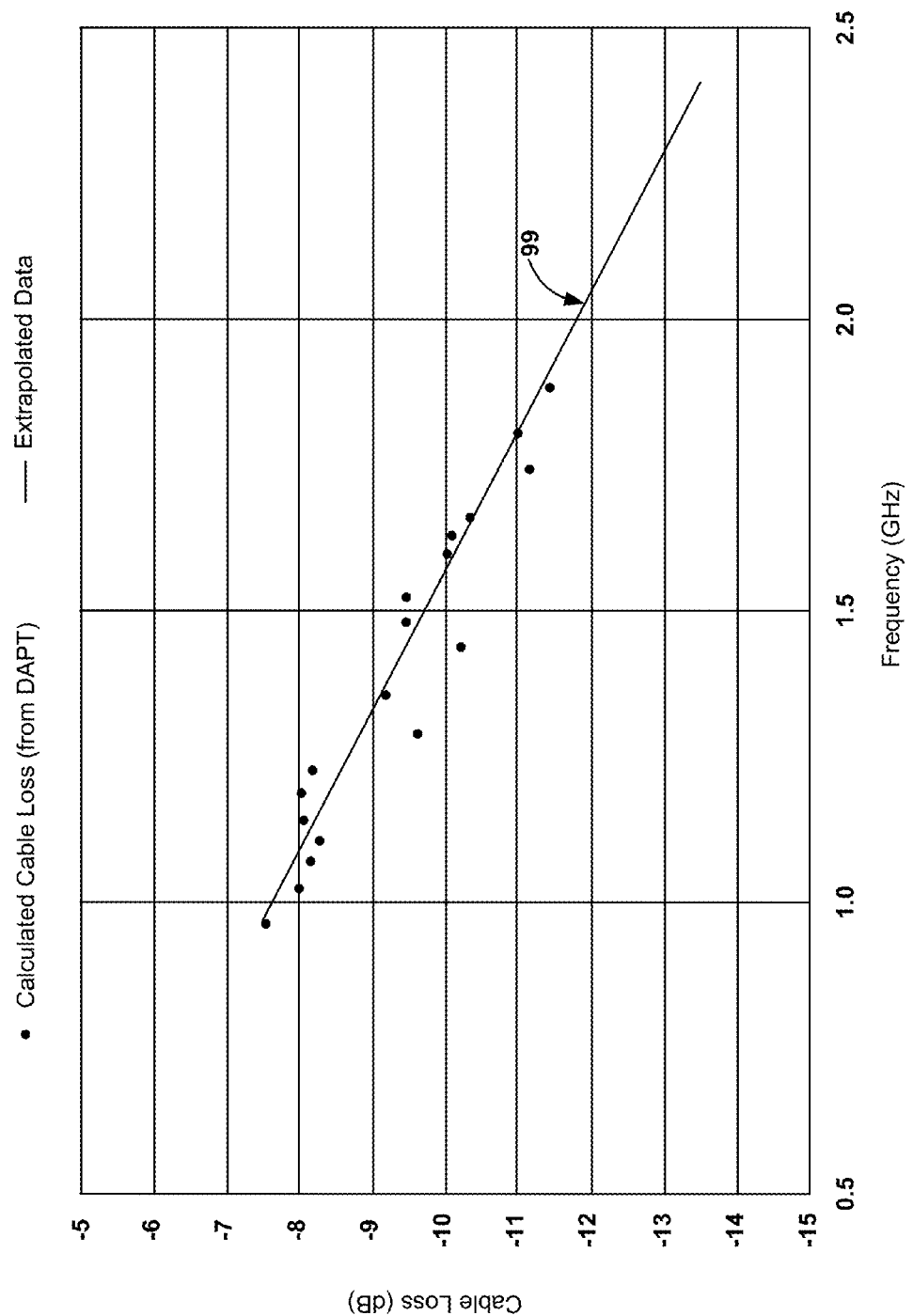
FIG. 5B is an example graphical representation of the extrapolation contemplated in the operational flow chart diagram of FIG. 5A.

FIG. 5B illustrates an example extrapolation contemplated in accordance with one embodiment, where the calculated cable loss data can be considered a function of frequency. It can be appreciated that cable loss has a linear relationship with frequency as evidenced by line 99. Thus, by extrapolating line 99 to other frequencies, e.g., frequencies above approximately 2 GHz in this example, the frequency range of the power detector can be expanded. This can also be used to improve the accuracy of the table.

It should be noted that in order to build a data repository of cable loss measurements relative as a function of frequency upon which extrapolation can be based, the generation of continuous wave carriers at operation 91 can occur over a plurality of different frequencies over which the IDU/modem is designed to operate. At each given frequency, power detector 66 may measure the power output by the IDU at operation 92, and the subsequent operations for retrieving power measurements (operation 93), averaging the power measurements (operation 94), calculating cable loss and storing cable loss data (operation 95), as well as performing the extrapolation (operation 96) can also be repeated. For example, if the IDU is configured to operate over the L band, operations 91-96 can be repeated for a particular frequency/frequency range within the L band. The steps or frequency ranges within a band of operation can vary. For example, output power on the cable can be measured every 50 MHz within the L band.

Returning to FIG. 5A, at operation 97, the cable loss determination mode entered or enabled at operation 90, can be disabled, and the wave carrier generation enabled at operation 91 can also be stopped. That is, after the IDU has finished retrieving power output measurements, the antenna pointing tool can be returned to its "normal" installation mode.

At operation 98, the table in which the calculated cable loss data is stored can be accessed and the values contained therein, applied to a given frequency to obtain cable loss values. For a given frequency, the output power of the IDU can be adjusted to account for the cable loss based on the cable loss value obtained from the table, e.g., the overall power attenuation to be used during the actual transmission of data between the IDU and ODU can be calculated using the cable loss value.

Accordingly, without having to use new/updated power detector hardware, the frequency range of the power detector can be expanded.

Figure 6:
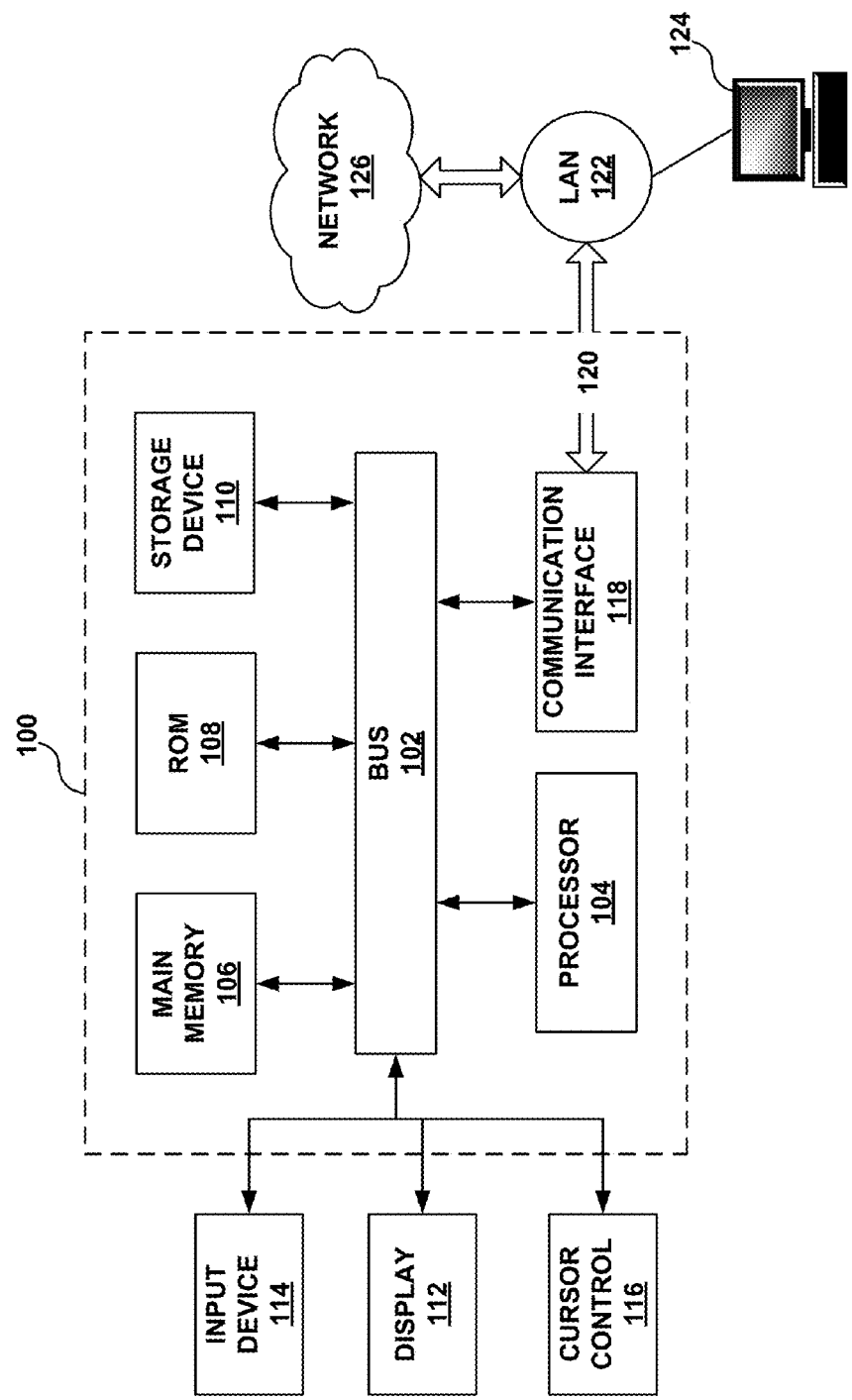
FIG. 6 illustrates an example computing component that may be used in implementing features of embodiments the technology disclosed herein.

FIG. 6 illustrates an example computer system including a computing component 100 with which example embodiments according to the present disclosure can be implemented. Computing component 100 can include a bus 102 or other communication mechanism for communicating information, and a processor 104 coupled to bus 102 for processing information. Computing component 100 may also include main memory 106, such as a random access memory (RAM) or other dynamic storage device, coupled to bus 102 for storing information and instructions to be executed by processor 104. Main memory 106 can also be used for storing temporary variables or other intermediate information during execution of instructions to be executed by processor 104. Computing component 100 may further include a read only memory (ROM) 108 or other static storage device coupled to bus 102 for storing static information and instructions for processor 104. A storage device 110, such as a magnetic disk or optical disk, may additionally be coupled to bus 102 for storing information and instructions.

Computing component 100 can be coupled via bus 102 to a display 112, such as a cathode ray tube (CRT), liquid crystal display (LCD), active matrix display, light emitting diode (LED)/organic LED (OLED) display, digital light processing (DLP) display, or plasma display, for displaying information to a computer user. An input device 114, such as a keyboard including alphanumeric and other keys, may be coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112.

According to one embodiment of the disclosure, automatic satellite terminal ranging, in accordance with example embodiments, are provided by computing component 100 in response to processor 104 executing an arrangement of instructions contained in main memory 106. Such instructions can be read into main memory 106 from another computer-readable medium, such as storage device 110. Execution of the arrangement of instructions contained in main memory 106 causes processor 104 to perform one or more processes described herein. One or more processors in a multi-processing arrangement may also be employed to execute the instructions contained in main memory 106. In alternative embodiments, hard-wired circuitry is used in place of or in combination with software instructions to implement various embodiments. Thus, embodiments described in the present disclosure are not limited to any specific combination of hardware circuitry and software.

Computing component 100 may also include a communication interface 118 coupled to bus 102. Communication interface 118 can provide a two-way data communication coupling to a network link 120 connected to a local network 122. By way of example, communication interface 118 may be a digital subscriber line (DSL) card or modem, an integrated services digital network (ISDN) card, a cable modem, or a telephone modem to provide a data communication connection to a corresponding type of telephone line. As another example, communication interface 118 may be a local area network (LAN) card (e.g. for Ethernet™ or an Asynchronous Transfer Model (ATM) network) to provide a data communication connection to a compatible LAN. Wireless links can also be implemented. In any such implementation, communication interface 118 sends and receives electrical, electromagnetic, or optical signals that carry digital data streams representing various types of information. Further, communication interface 118 may include peripheral interface devices, such as a Universal Serial Bus (USB) interface, a PCMCIA (Personal Computer Memory Card International Association) interface, etc.

Network link 120 typically provides data communication through one or more networks to other data devices. By way of example, network link 120 can provide a connection through local network 122 to a host computer 124, which has connectivity to a network 126 (e.g. a wide area network (WAN) or the global packet data communication network now commonly referred to as the "Internet") or to data equipment operated by service provider. Local network 122 and network 126 may both use electrical, electromagnetic, or optical signals to convey information and instructions. The signals through the various networks and the signals on network link 120 and through communication interface 118, which communicate digital data with computing component 100, are example forms of carrier waves bearing the information and instructions.

Computing component 100 may send messages and receive data, including program code, through the network (s), network link 120, and communication interface 118. In the Internet example, a server (not shown) might transmit requested code belonging to an application program for implementing an embodiment of the present disclosure through network 126, local network 122 and communication interface 118. Processor 104 executes the transmitted code while being received and/or store the code in storage device 110, or other non-volatile storage for later execution. In this manner, computer system 100 obtains application code in the form of a carrier wave.

The term "computer-readable medium" as used herein refers to any medium that participates in providing instructions to processor 104 for execution. Such a medium may take many forms, including but not limited to non-volatile media, volatile media, and transmission media. Non-volatile media include, for example, optical or magnetic disks, such as storage device 110. Volatile media may include dynamic memory, such as main memory 106. Transmission media may include coaxial cables, copper wire and fiber optics, including the wires that comprise bus 102. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 7:
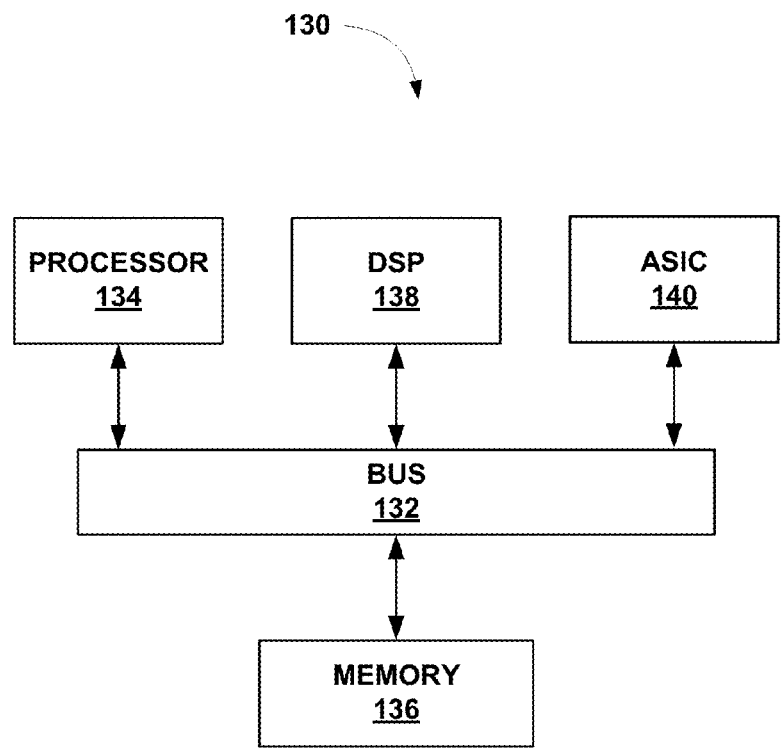
FIG. 7 illustrates an example chip set that can be utilized in implementing architectures and methods for cable loss measurement in accordance with embodiments the technology disclosed herein.

FIG. 7 illustrates a chip set 130 in which embodiments of the disclosure may be implemented. Chip set 130 can include, for instance, processor and memory components described with respect to FIG. 6 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 130 includes a communication mechanism such as a bus 132 for passing information among the components of the chip set 130. A processor 134 has connectivity to bus 132 to execute instructions and process information stored in a memory 136. Processor 134 includes one or more processing cores with each core configured to perform independently. A multi-core processor enables multiprocessing within a single physical package. Examples of a multi-core processor include two, four, eight, or greater numbers of processing cores. Alternatively or in addition, processor 134 includes one or more microprocessors configured in tandem via bus 132 to enable independent execution of instructions, pipelining, and multithreading. Processor 134 may also be accompanied with one or more specialized components to perform certain processing functions and tasks such as one or more digital signal processors (DSP) 138, and/or one or more application-specific integrated circuits (ASIC) 140. DSP 138 can typically be configured to process real-world signals (e.g., sound) in real time independently of processor 134. Similarly, ASIC 140 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 134 and accompanying components have connectivity to the memory 136 via bus 132. Memory 136 includes both dynamic memory (e.g., RAM) and static memory (e.g., ROM) for storing executable instructions that, when executed by processor 134, DSP 138, and/or ASIC 610, perform the process of example embodiments as described herein. Memory 136 also stores the data associated with or generated by the execution of the process.

As used herein, the term component might describe a given unit of functionality that can be performed in accordance with one or more embodiments of the present application. As used herein, a component might be implemented utilizing any form of hardware, software, or a combination thereof. For example, one or more circuits, processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or other elements of the application are implemented in whole or in part using software, in one embodiment, these software elements can be implemented to operate with a computing or processing component capable of carrying out the functionality described with respect thereto. One such example computing component is shown in FIG. 6. Various embodiments are described in terms of this example-computing component 100. After reading this description, it will become apparent to a person skilled in the relevant art how to implement the application using other computing components or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A power detector for detecting the output power of a satellite indoor unit connected to a satellite outdoor unit by a cable, comprising:
   a filter for substantially isolating radio frequency (RF) signals transmitted at each of a plurality of frequencies from the satellite indoor unit to the satellite outdoor unit at a termination point of the cable that connects the cable to the satellite outdoor unit, wherein the RF signals comprise low power continuous wave tones transmitted at different frequencies covering a frequency range of a frequency band;
   an RF detector configured to detect the RF signals; and
   a microcontroller comprising an analog to digital converter (ADC) component configured to convert the detected RF signals into voltage data, the microcontroller further configured to:
     convert the voltage data into power attenuation over the cable data;
     store the power attenuation over the cable data in conjunction with extrapolated power attenuation over the cable data determined based upon the power attenuation over the cable data; and
     transmit at least one of the power attenuation over the cable data and the extrapolated power attenuation over the cable data to the satellite indoor unit for adjustment of the satellite indoor unit output power to avoid compression at the satellite outdoor unit.

2. The power detector of claim 1, wherein the filter comprises a high pass filter.

3. The power detector of claim 2, wherein the microcontroller transmits the voltage data via a digital satellite equipment control (DISEqC) interface.

4. The power detector of claim 1, wherein the frequency band is the L band.

5. The power detector of claim 1, wherein the satellite indoor unit comprises at least one of a set-top box receiver and a satellite Internet modem.

6. The power detector of claim 1, wherein the satellite outdoor unit comprises a block upconverter.

7. The power detector of claim 1, wherein the satellite indoor unit output power is at least one of temperature compensated and calibrated.

8. A power detector for detecting the output power of a satellite indoor unit connected to a satellite outdoor unit by a cable, comprising:
   a filter for substantially isolating radio frequency (RF) signals transmitted at each of a plurality of frequencies from the satellite indoor unit to the satellite outdoor unit at a termination point of the cable that connects the cable to the satellite outdoor unit;
   an RF detector configured to detect the RF signals; and
   a microcontroller comprising an analog to digital converter (ADC) component configured to convert the detected RF signals into voltage data, the microcontroller further configured to:
     convert the voltage data into power attenuation over the cable data;
     store the power attenuation over the cable data in conjunction with extrapolated power attenuation over the cable data determined based upon the power attenuation over the cable data; and
     transmit at least one of the power attenuation over the cable data and the extrapolated power attenuation over the cable data to the satellite indoor unit for adjustment of the satellite indoor unit output power to avoid compression at the satellite outdoor unit, wherein the microcontroller is configured to average the detected RF signals associated with each of the plurality of frequencies, and wherein the conversion of the detected RF signals into the voltage data comprises conversion of the averaged, detected RF signals into the voltage data.

9. A power detector for detecting the output power of a satellite indoor unit connected to a satellite outdoor unit by a cable, comprising:
   a filter for substantially isolating radio frequency (RF) signals transmitted at each of a plurality of frequencies from the satellite indoor unit to the satellite outdoor unit at a termination point of the cable that connects the cable to the satellite outdoor unit, wherein the RF signals comprise low power continuous wave tones transmitted at different frequencies covering a frequency range of a frequency band;
   an RF detector configured to detect the RF signals; and
   a microcontroller comprising an analog to digital converter (ADC) component configured to convert the detected RF signals into voltage data, the microcontroller further configured to:
     convert the voltage data into power attenuation over the cable data;
     store the power attenuation over the cable data in conjunction with extrapolated power attenuation over the cable data determined based upon the power attenuation over the cable data; and
     transmit at least one of the power attenuation over the cable data and the extrapolated power attenuation over the cable data to the satellite indoor unit for adjustment of the satellite indoor unit output power to avoid compression at the satellite outdoor unit, wherein the conversion of the voltage data into power attenuation over the cable data comprises subtracting the voltage data indicative of the satellite indoor unit output power over the cable from the satellite indoor unit output power prior to transmission over the cable.

10. A device, comprising:
a first interface comprising an input connected to a cable, wherein the cable comprises a first end connected to a satellite indoor unit and a second end connected to the input of the first interface;
a second interface, comprising:
an input connected to an output of the first interface; and
an output connected to a satellite outdoor unit;
a power detector for measuring transmit power loss of signals transmitted at each of a plurality of frequencies by the satellite indoor unit along the first end of the cable to the second end of the cable;
a microcontroller for storing data regarding the measured transmit power loss in a data store comprising a plurality of measured transmit power loss data including extrapolated power loss data based upon the plurality of measured transmit power loss data relative to each of the plurality of frequencies; and
a third interface through which the extrapolated transmit power loss data is transmitted to a modem of the indoor unit, the modem of the indoor unit adjusting its power output based upon the extrapolated transmit power loss data.

11. The device of claim 10, wherein the first interface comprises a receive interfacility (IFL) component and wherein the second interface comprises a low noise block (LNB) IFL component.

12. The device of claim 10, wherein the communications link comprises at least one IFL coaxial cable connecting a satellite indoor unit to a satellite outdoor unit.

13. The device of claim 10, wherein power detector detects power associated with radio frequency (RF) signals transmitted from the first interface to the second interface.

14. The device of claim 13, wherein the RF signals comprise low power continuous wave tones transmitted across each of the plurality of frequencies.

15. The device of claim 10, wherein the third interface comprises a digital satellite equipment control (DISEqC) interface.

16. The device of claim 10, wherein the microcontroller averages the stored data regarding the measured transmit power loss such that the extrapolated power loss data is based upon the averaged transmit power loss data relative to each of the plurality of frequencies.

17. The device of claim 10, wherein the power output of the modem of the indoor unit is at least one of temperature compensated and calibrated.

18. A system, comprising:
a satellite indoor unit comprising an output;
a satellite outdoor unit comprising an input, a block upconverter (BUC), and an antenna dish;
a cable connecting the output of the satellite indoor unit to the input of the satellite outdoor unit; and
a power detector for detecting the output power of the satellite indoor unit at the input of the satellite outdoor unit, the power detector comprising:
a filter for substantially isolating radio frequency (RF) signals transmitted from the satellite indoor unit to the satellite outdoor unit at the input of the satellite outdoor unit, wherein the RF signals comprise low power continuous wave tones transmitted at different frequencies covering a frequency range of a frequency band;
an RF detector configured to detect the RF signals; and
a microcontroller comprising an analog to digital converter (ADC) component configured to convert the detected RF signals into voltage data, the microcontroller further configured to:
convert the voltage data into power attenuation over the cable data;
store the power attenuation over the cable data in conjunction with extrapolated power attenuation over the cable data determined based upon the power attenuation over the cable data; and
transmit at least one of the power attenuation over the cable data and the extrapolated power attenuation over the cable data to the satellite indoor unit for adjustment of the satellite indoor unit for adjustment of the satellite indoor unit output power to avoid saturation at the BUC of the satellite outdoor unit.

19. The system of claim 18, further comprising an antenna pointing tool, wherein the antenna pointing tool comprises:
the power detector;
a receive interfacility (IFL) component; and
a low noise block (LNB) IFL component.

20. The system of claim 18, wherein the satellite indoor unit output power is at least one of temperature compensated and calibrated.

* * * * *